United States Patent [19]

Malecek et al.

[11] Patent Number: 5,069,062
[45] Date of Patent: Dec. 3, 1991

[54] FLUID DAM AND PRESSURE TESTER APPARATUS AND METHOD OF USE

[75] Inventors: Edward L. Malecek, Delano; Charles H. Ramberg, Dayton, both of Minn.

[73] Assignee: Arctic Fox Heaters, Inc., Minneapolis, Minn.

[21] Appl. No.: 588,500

[22] Filed: Sep. 28, 1990

[51] Int. Cl.⁵ .............................................. G01M 3/26
[52] U.S. Cl. ..................................... 73/49.7; 73/45.8
[58] Field of Search ................. 73/49.7, 45.8, 40, 37, 73/118.1

[56] References Cited

U.S. PATENT DOCUMENTS

| | | | |
|---|---|---|---|
| 2,784,731 | 3/1957 | Bealer | 73/45.8 X |
| 4,235,100 | 11/1980 | Branchini | 73/49.7 |
| 4,303,610 | 12/1981 | Sardisco et al. | 422/61 |
| 4,494,402 | 1/1985 | Carney | 73/49.7 X |
| 4,888,980 | 12/1989 | DeRome | 73/49.7 X |
| 4,996,874 | 3/1991 | Colomer et al. | 73/49.7 X |

Primary Examiner—Tom Noland
Assistant Examiner—Joseph W. Roskos
Attorney, Agent, or Firm—Patterson & Keough

[57] ABSTRACT

An apparatus connectable to fluid containing operating systems which creates a vacuum effect upon the fluid in the operating system during repairs and maintenance. The apparatus also permits pressure testing of the repairs and maintenance to the operating system without removal of the apparatus therefrom.

16 Claims, 6 Drawing Sheets

FIG. 5
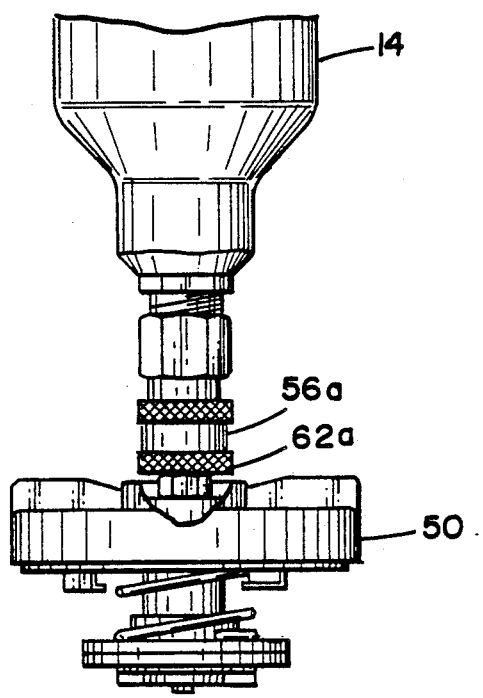
FIG. 6
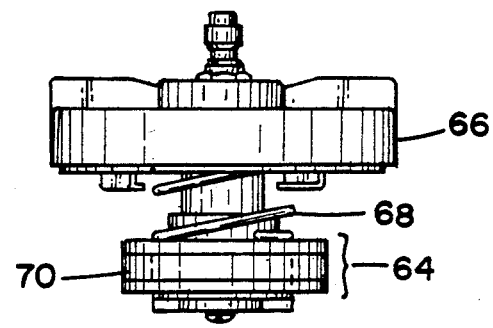
FIG. 7
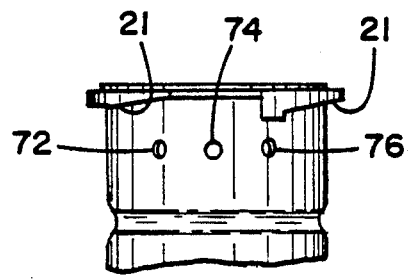
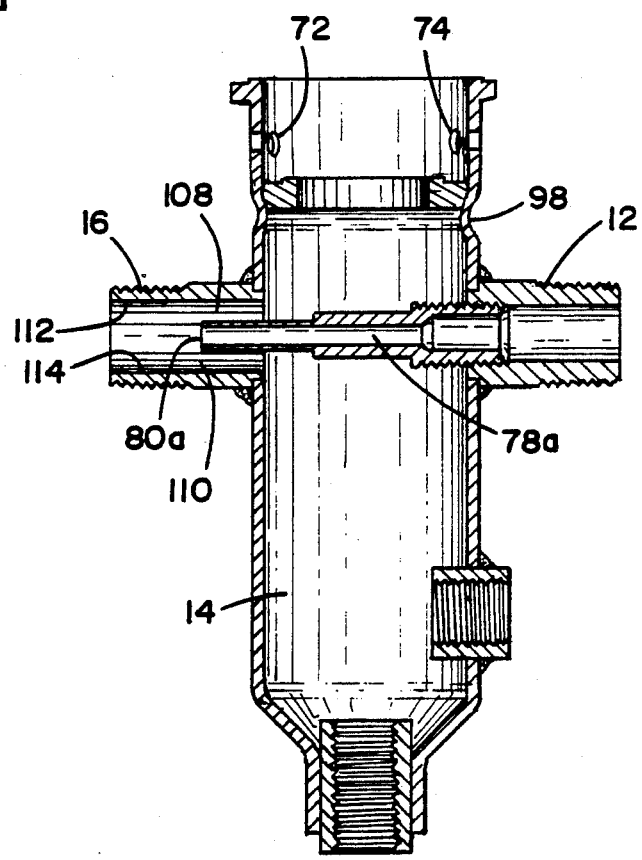
FIG. 8A

FLUID DAM AND PRESSURE TESTER APPARATUS AND METHOD OF USE

FIELD OF THE INVENTION

This invention relates to apparatus connectible to fluid containing operating systems which creates a vacuum effect upon the fluid in the operating system to retain the fluid therein while repair or maintenance is performed and which is then used as a pressure tester to check for leaks in the operating system after the maintenance or repair is complete.

BACKGROUND OF THE INVENTION

The vacuum and pressure tester apparatus and method of retaining coolant and testing of the present invention finds its primary use in connection with closed loop operating systems such as pressurized vehicle engine cooling systems, particularly those systems including a pressure-type cap filler having a one-way vacuum valve. Although the invention is illustrated, and will be described, in that environment, it will be apparent to those skilled in the art that the apparatus and the method of retaining fluids and pressure testing the equipment containing the fluids disclosed herein may find suitable uses in other environments where it is desired to observe the pressure integrity of closed systems, to observe the pressures under which pressure responsive valve systems will react to relieve pressure, and to determine the effectiveness and proper calibration of the pressure responsive valves which may be employed in such systems. Other uses of this invention include, for example, brake systems testing, fuel crossover line maintenance, etc.

The vast majority of internal combustion engines utilize a liquid cooling system to maintain the engine within an optimum range for operating efficiency, the liquid typically being water with certain additives. The cooling system of such internal combustion engines generally employs liquid flow paths through a water pump and which then extend within or around the engine block where heat is transferred from the operating engine to the water, and then through a radiator where heat transfer occurs between the liquid and the atmosphere. With the advent of higher horsepower engines, the use of smaller radiators due to considerations of costs and styling limitations, and higher operating temperatures for the engines, a considerable amount of heat is developed which must be dissipated through a relatively small area represented by the radiator surface. As a consequence, the majority of these cooling systems operate under pressure. By pressurizing the system, the boiling point of the coolant is raised, resulting in less loss of coolant by evaporation with a proportional increase in cooling efficiency.

The amount of pressure developed in these cooling systems depends to a large extent upon the temperature of the coolant and the speed at which the engine is operated. Since the cooling system is designed to be a closed system, any minor leaks present anywhere in the flow path will reduce the efficiency of the system and can result in excessive loss of coolant. As the coolant is lost through such leaks, the capability of the system to keep the engine temperature from rising above an optimum operating level is accordingly decreased, and if enough of the coolant is lost, overheating occurs with consequent damage to the engine. It is thus commonly observed that the cooling systems of internal combustion engines should be pressure tested periodically and on a regular basis in order to assess the integrity of the system and to detect the presence of leaks. Similarly, the efficiency of other systems may be degraded by leaks which permit undesired loss of pressure or which allow introduction of unwanted contaminants or gases.

The pressurized cooling systems currently in use include a radiator having a filler neck formed to provide a mouth typically including a lip for securing engagement through a camming action with a filler cap to thereby form an outer closure seat around the mouth of the radiator. The typical cap designed for use with this system further includes a resiliently mounted valve element which forms an inner seal to the filler neck through cooperation with an inner seat within the neck. The valve element is under yielding spring pressure such that the inner seal will be broken within a rated pressure range. Ideally, the spring which presses the valve against the inner seat is calibrated to hold the valve in sealing engagement with the inner seat as long as the pressure within the system does not exceed a predetermined value, and then to yield whenever the pressure exceeds that value. Since the cooling efficiency of any such system is optimum when the system is operated under the pressure of which that system was designed, any weakening of the spring or malfunction of the valve which permits the premature escape of pressure will lower the efficiency of the system.

A coolant overflow vent and/or line is provided intermediate the outer and inner seals of the filler neck through which pressure relief occurs. In most vehicles which are equipped with coolant recovery systems, coolant passing through an overflow line is carried to a collection tank. When the engine cools, a one-way vacuum valve located internally of the radiator cap will open in response to the vacuum formed in the radiator, permitting coolant in the collection tank, or simply air, to flow back into the cooling system.

At the present time, there are commercially available pressure testers which are designed to simply test the radiator and the radiator filler cap. Such devices typically comprise a small air pump and an associated pressure gauge that communicate with a cap-like fixture applied in place of the cap. Pressure is then applied to the radiator, and thus to the entire coolant flow path, through use of a hand pump until the system is at its rated pressure level as measured by the gauge. If little or no pressure drop is thereafter observed, the radiator is presumed to be holding pressure properly. When these devices are used to check the radiator filler cap, the cap is connected directly to the device through the use of an adapter which serves to form a seal with the pressure valve of the filler cap similar to that which exists in the radiator filler neck. The adapter is then pressurized through use of the hand pump, and the gauge is observed for the tightness of the seal as well as for a measurement of when the pressure relief valve in the filler cap opens.

Also, the prior art tester requires that the cap be removed from the filler neck for test purposes. Consequently, a hot pressurized system must be allowed to cool so that the cap can be safely removed, or the system must be otherwise vented to reduce the pressure to a point where the filler cap can be removed. If venting of the hot system is done too quickly, this can result in an unnecessary as well as excessive loss of coolant.

In addition, when repairs or replacement parts are needed in a radiator, much time is wasted currently since the engine coolant must be drained from the radiator, hoses must be removed, the repair or replacement must be made, the radiator must be filled in with coolant, the radiator is then checked for leakage, additional coolant may be added and the radiator must again be checked for leakage, all of this requiring at least 15-20 minutes of intensive labor activity.

SUMMARY OF THE INVENTION

This invention relates to a pressure and vacuum test apparatus for retaining fluid in a closed-loop fluid-containing operating system during maintenance and repair. The apparatus also provides for pressure testing the operating system for leaks and system integrity after completion of work thereon. A main housing is provided with a first end, a second end, and walls defining an internal chamber. An inlet conduit comprising walls defining a first inner flow chamber which is suitable for providing flow through passage for a pressurized medium is provided, with said inlet conduit being connected to the main housing. An outlet conduit is also provided which has walls defining a second inner flow chamber which is suitable for providing flow through passage for a medium. The outlet conduit is also connected to the main housing. Attachment means is provided and located on the second end of the main housing for connecting the apparatus to a normally closed-loop fluid-containing operating system so that the fluid within the operating system is in flow through communication with the main housing internal chamber. Nozzle means is provided and located within the main housing internal chamber. The nozzle means extend generally from the inlet conduit toward the outlet conduit in order to selectively create different pressure levels within the internal chamber when a pressurized medium flows therethrough. This in turn provides the apparatus with the ability to selectively create a vacuum effect or a pressurized effect upon fluid within the closed-loop operating system to both retain the fluid in the operating system during work thereon and to permit pressure testing of the operating system at the completion of such work.

BRIEF DESCRIPTION OF THE DRAWINGS

FIG. 5 shows an enlarged view of the conventional quick fit disconnect coupling shown in FIG. 4.

FIG. 6 shows an enlarged view of the male quick coupler and radiator cap shown in FIGS. 4 and 5.

FIG. 7 shows the top ramp of the housing to accept the radiator cap, and pressure relief vent holes.

FIG. 8A is a cross sectional view of the main body and portions of the two extending arms shown in FIG. 4.

DETAILED DESCRIPTION OF THE INVENTION

As required, detailed embodiments of the present invention are disclosed herein. It is to be understood, however, that the disclosed embodiments are merely exemplary of the invention, which may be embodied in various forms. Therefore, specific structural and functional details disclosed herein are not to be interpreted as limiting, but rather as a basis for teaching one skilled in the art to variously employ the present invention in virtually any appropriately detailed system or structure.

This invention relates to a tool that creates a vacuum in an operating system so that fluid within the operating system, such as engine coolant or hydraulic fluid, is retained in the system during repairs and maintenance, and which tool also acts as a pressure tester for testing the system upon completion of such repairs or maintenance.

Figure 1:
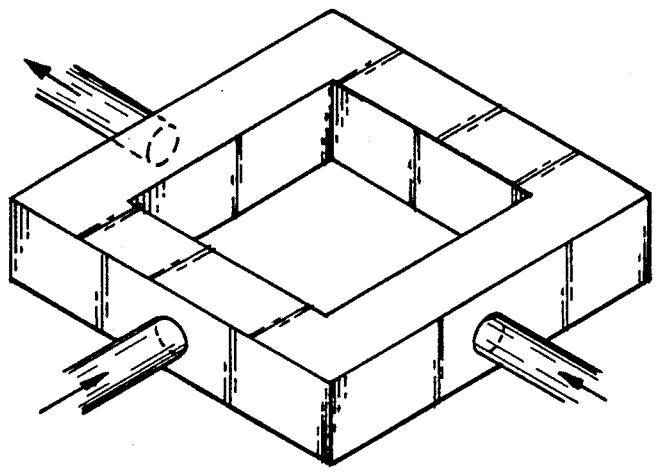
FIG. 1 is a block diagram showing a prior art device.

Referring to FIG. 1, a representative prior art device creates a vacuum in an air conditioning system, which causes water in the system to boil and evaporate out. In such a device, it is usually necessary to increase the volumetric flow of the air in order to remove the moisture. When used with an engine, the radiator cap is replaced with an adaptor to create a vacuum in the cooling system, however the volume of air flowing through such a device is not adequate to retain the coolant when the system is opened, for example for repair, maintenance, component replacement, etc.

Figure 2:
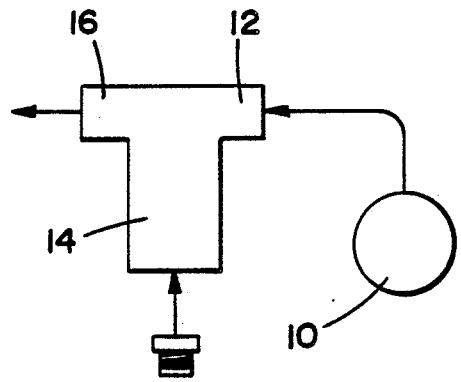
FIG. 2 is a block diagram of the invention illustrating air flow through the device.
Figure 3:
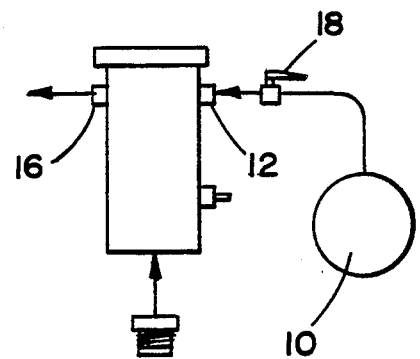
FIG. 3 is a block diagram illustrating means for regulating the air flow with a nozzle in the present invention.

One embodiment of the present invention is illustrated schematically in FIGS. 2 and 3. Pressurized medium source canister 10 is attached to pressure inlet port or conduit 12 which is located at one side of a generally T-shaped center body or housing 14. The pressurized medium travels from source canister 10, into pressure inlet port 12, through center body housing 14, which includes and/or functions as a venturi-type valve, and exits through pressure outlet port 16.

As can be seen in FIG. 3, pressurized medium leaving source canister 10 flows through nozzle 18 toward pressure inlet port or conduit 12. In both FIGS. 2 and 3, the pressurized medium passes through pressure inlet 12 and through center body 14, which acts as a venturi valve, before exiting through pressure outlet port or conduit 16. The following description shall refer to the pressurized medium generally as air, but such description shall not be deemed limiting in view of the many different pressurized mediums or gases which may be utilized within the scope of this invention.

Figure 4:
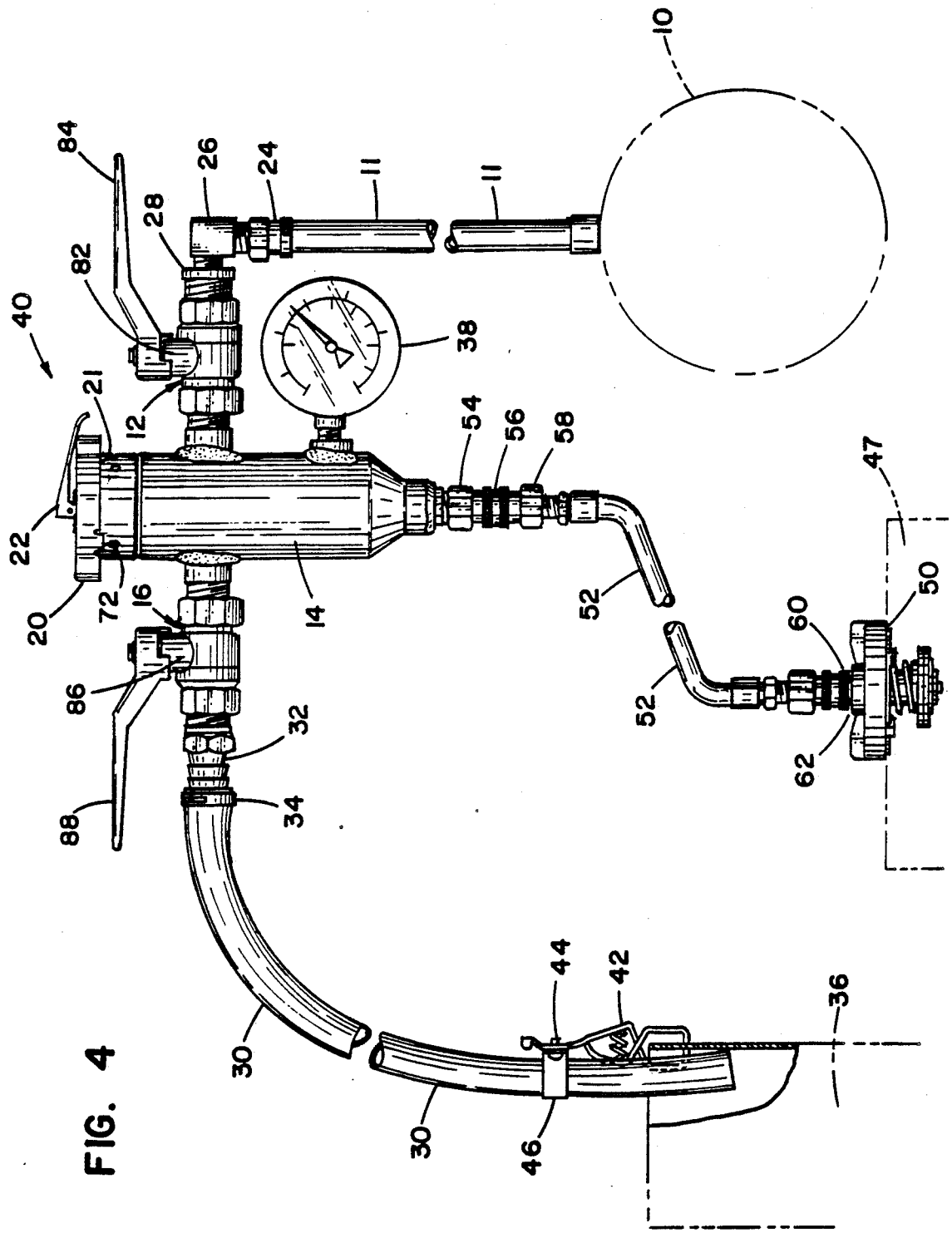
FIG. 4 shows a side view of the present invention with optional components.

Another embodiment of the assembled device of the present invention is shown more clearly in FIG. 4. Center body 14 has an air inlet port 12 and an air outlet or exhaust port 16 extending from it. In one preferred embodiment, the air inlet port 12 and air outlet or exhaust port 16 lie generally in the same horizontal plane, approximately 180° from each other, on opposite sides of center body 14, although such orientation may differ in other embodiments. Air inlet port 12 includes flow control valve 82, which is preferably a ball valve, but which may comprise other types of construction. Exhaust port 16 includes an optional pressure gate valve 86, which is also preferably a ball valve, but which may have alternate construction. Self-locking radiator cap 20 is securely engaged on the top portion of center body 14 with lock tabs (not shown) which engage against cammed surfaces 21 on apparatus 40, as shown in FIG. 7. Self-locking radiator cap 20 includes flip tab 22, which can be raised or lowered, for further securing radiator cap 20 securely into position when flip tab 22 is in a lowered position, as shown in FIG. 4. Flip tab 22 is not required but it provides additional security against inadvertent loss of cap 20 during pressure testing. Pressure gauge 38 is optionally attached to, or is integral with, center body 14 and is constructed to provide positive or negative pressure readings sensed from within an inner chamber of center body 14. In some embodiments, a pressure gauge is not required for the present invention to function with great advantage.

A male quick coupler fitting 24 is attached to elbow 26 which in turn is attached to bushing 28 located at the outer most end of air inlet conduit 12. Alternatively, a standard air nozzle connector, such as a ⅜ inch connector (not shown) can be utilized for direct attachment to the pressurized medium source canister 10. Air hose 11 is connected to source canister 10 at one end and to male quick coupler fitting 24 at the other end, and is used as a conduit for air flow from source canister 10 to the pressure and vacuum tester apparatus 40. Discharge hose 30 is attached to the outer most edge of exhaust conduit 16 on exhaust port barbed fitting 32. Discharge hose 30 is preferably held in place on the exhaust port barbed fitting 32 by hose-clamp 34, although other connection means are possible. Discharge hose 30 extends from outlet conduit 16, terminating at a selected discharge location, for example in a container 36, such as a bucket, where discharge hose 30 may be secured. Spring clip 42 may be used to secure discharge hose 30 to container 36. Although container 36 is shown, and such use is encouraged in operation, such container is not required within the scope this invention. It is advisable to connect discharge hose 30, at least, to some fixture to prevent unwanted movement of the discharge hose 30 during flow of the pressurized medium therethrough. Spring clip 42 is held in place by kept nut 44 on hose band 46.

Apparatus 40 is connected to an operating system (such as a radiator 47 in a car, truck, or other vehicle) by removing, for example, the standard radiator cap located on the vehicle radiator and using radiator cap adapter 50 as shown in FIG. 4 in its place. Optional extension hose 52 may be used to connect radiator cap adapter 50 to center body housing 14. When utilized, extension hose 52 is preferably attached to center body housing 14 by utilizing bushing 54, female coupler 56, and male coupler 58. The other end of extension hose 52 is attached to radiator cap adapter 50 by female coupler 60 and male coupler 62. Extension hose 52 is particularly useful in applications where the radiator is in an inconvenient or hard to reach position and flexibility or clearance area is needed for positioning apparatus 40 onto the radiator or other operating system component. Similarly, spring clip hangar 102 (shown in FIG. 11) is useful where the radiator configuration is inconvenient or difficult to access.

Alternatively, as can be seen in FIG. 5, a conventional quick fit disconnect comprising a female coupler 56a and a male coupler 62a can be utilized to join center body housing 14 directly to radiator cap adaptor 50, without using extension hose 52. In this configuration, no extension hose 52 is needed because of the convenient or well-placed position of the radiator or other connection component in the vehicle or operating system.

Preferred components of one embodiment of radiator cap adaptor 50 are shown in more detail in FIG. 6, and includes radiator cap 66 which is separated from male connection assembly 64 by spring 68. As discussed above, the conventional radiator cap on a vehicle radiator is removed air radiator cap 66 is tightened into its place. Radiator cap 66 fits standard radiator necks and installs quickly and easily as a radiator cap. Adapters with quick connect/disconnects of all varieties can be utilized to fit non-standard radiator necks. As can be seen in FIG. 6, spacers 70 can be optionally utilized to accommodate the adapters for such non-standard necks. In addition, spacer washers can be utilized to ensure better sealing between the radiator neck and radiator cap 66 and can be placed at various locations. The size of the spacer 70 may vary according to the adaptor utilized and other considerations. Similarly, the shape and type of male connection assembly may vary.

Referring now to FIG. 7, pressure relief means is disclosed which could comprise a port, a pop-off valve, a relief cap, or the like. The embodiment of FIG. 7 shows at least one pressure relief port, such as pressure relief ports 72, 74, 76 which is located on center body housing 14 near self-locking radiator cap 20. When apparatus 40 is utilized as a pressure tester, the said at least one pressure relief port, such as pressure relief ports 72, 74, 76, is constructed to relieve the pressure in the system so that the system is not over pressurized. Pressure relief is preferably set at or near the pressure rating of the cap used on the cooling system. The existing cap supplied with a kit comprising the present invention is set, preferably, at 14 lbs (PSI), although such setting may vary. As noted herein, pressure relief means may comprise other structure within the scope of this invention, such as a pop-off valve.

FIG. 8A illustrates a nozzle 78a located within center body housing 14. Nozzle 78a is inserted, for example by threaded means, into air inlet port 12, and extends from air inlet port 12 toward, and in this embodiment into, discharge/exhaust port 16. Nozzle 78a in FIG. 8A has a stepped-down sectional configuration, being wider at air inlet port 12, with slight narrowing or tapering towards air outlet port 16. The diameter of end 80a of nozzle 78a is preferably smaller than the diameter of the sidewalls 112, 114 of exhaust port 16, so that there is defined a gap 108, 110 in the manner of an annular flow region between end 80a of nozzle 78a and side walls 112, 114 of exhaust conduit or port 16. Gap 108, 110 permits flow of a gas or fluid from within center body housing 14 to be drawn into the discharge/exhaust port during a vacuum configuration of use, as will be further discussed herein.

Figure 8B:
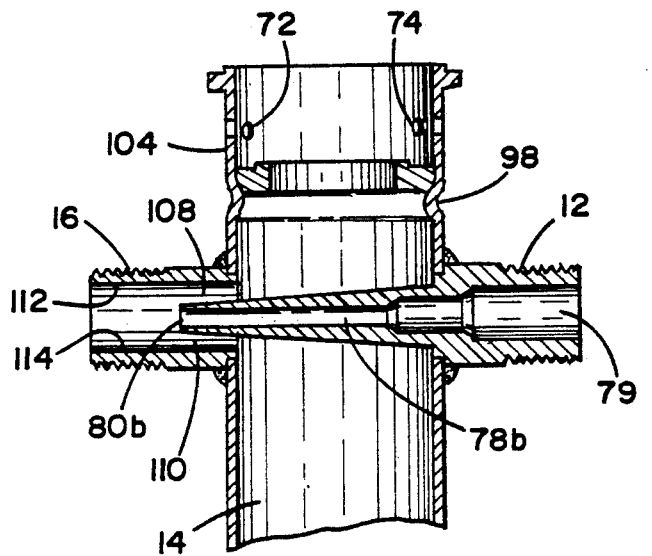
FIG. 8B is a cross sectional view of an alternative embodiment of the main body and portions of the two extending arms shown in FIG. 4.

FIG. 8B shows an alternative embodiment of nozzle 78a. Nozzle 78b has a more aerodynamic, smooth, regular outer configuration as compared with the stepped-down configuration of nozzle 78a in FIG. 8A. Nozzle 78b may also be integrally constructed with the inlet side of air inlet port 12, and thus not necessarily be threaded into air inlet port 12. As can be seen in FIG. 8B, nozzle 78b extends from air inlet port 12 into discharge or exhaust port 16. The diameter of nozzle 78b internal flow chamber 79 preferably narrows from air inlet port 12 toward exhaust port 16, although some advantage might still be achieved using a straight-bore or other bore design. End 80b of nozzle 78b is thus preferably of a smaller diameter than the diameter between side walls 112, 114 of exhaust port 16, in the manner of and for similar purpose as discussed in relation to end 80a shown in FIG. 8A. As will be further discussed in relation to FIGS. 13-16, many configurations of nozzle means are contemplated within the scope of this invention.

Center body housing 14, inlet port 12, and outlet port 16 can be spun from tubing, such as high quality aluminum tubing, preferably as 6061-T6 aluminum or other materials. Center body 14 may then be chrome plated or polished for durability. In such an embodiment, apparatus 40 is very strong yet light in weight. It is also possible to fabricate center body housing 14 and peripheral components from other metals, such as zinc, etc. Valve handles 84, 88 may be made from similar materials. Alternatively, center body housing 14, inlet port 12, outlet port 16, and nozzle 78a or 78b can be integrally molded from materials such as plastic and other non-metallics. A cast construction is also provided.

Referring again to FIG. 4, extension hose 52, air source hose 11, and discharge hose 30 are conventional hoses used in the industry. While different diameters and lengths of hose can be utilized, at least one preferred embodiment includes air source hose 11 being a minimum of ⅜ inch in diameter and less than twenty five feet in length; discharge hose 30 being approximately ⅝ inch or ¾ inch in diameter and about seven feet in length; and extension hose 52 being approximately ½ inch in diameter and fourteen inches long, although the length of extension hose 52 may vary depending on the structure/vehicle being worked on. Air pressure gauge 38 is a standard gauge used in the industry, such that negative and positive pressure readings from within center body 14 can be selectively attained and monitored.

Apparatus 40 provides exceptional performance advantages and lower cost per use over any known devices(s) due, in part, to its dual functional design as both an evacuator and a pressurizer. Other structural and design features are described herein and provide further advantages. For example, by achieving this dual functional design without need of electrical or electronic components/power then cost advantage and reliability is greatly enhanced. Moreover, apparatus 40 may be utilized on various systems, including hydraulics as well as coolant systems, to thus multiply its usefulness and versatility. Two modes of use are available; a pressure test mode and a vacuum mode. In the vacuum mode, source air passes through apparatus 40 and retains coolant, such as vehicular radiator coolant, in the cooling system during minor repairs. Repairs could include, for example, block openings up to approximately ¾ inch diameter, replacement of parts, or other repairs. A negative pressure wall, dam, or block is provided by the unique configuration or configurations of apparatus 40 which enables removal of components from a closed, yet fluid filled, system, i.e. a system within which it is desired that an operating fluid be retained during maintenance or repair. In other words, the pressure dam acts to overcome the gravitational drain of fluid from the system in the vacuum mode.

When it is desirable to retain coolant in the cooling system when removing heater hoses, coolant sensors, small pipe plugs, and the like, the radiator cap of the radiator in the vehicle is removed. Apparatus 40 is then connected to the radiator neck of the radiator (not shown using radiator cap adaptor 50. It is important that self-locking radiator cap 20 is secured into place and locked onto the top of apparatus 40, with locking means, for example lock tabs, engaged against stops such that flip tab 22 is in a lowered position to insure that radiator cap 20 is sealed against the washer.

Referring to FIG. 4, inlet flow control valve 82 is regulated to achieve the required reading on pressure gauge 38. First, with flow control valve 82 in a closed position, air supply source canister 10 is connected to air inlet port 12 through, for example, fitting 24. Discharge hose 30 is connected by friction and hose clamp 34 to exhaust port barbed fitting 32. Discharge hose 30 is secured to a fixture, such as container 36, by spring clip 42 so as to collect any minor amount of coolant which might be expelled and to prevent unwanted hose movement. Pressure gate valve 86 is then opened by handle 88. Once apparatus 40 is connected to the radiator of the vehicle (with optional extension hose 52) as seen in FIG. 4, or with the snap connection as shown in FIG. 5, flow control valve 82 is slowly opened until the optimum negative pressure reading on pressure gauge 38 is attained for that particular system. As the air flows through flow control valve 82, through center body housing 14 and through discharge port 16, a venturi effect results, creating a low pressure in center body housing 14, and thereby creating a vacuum or suction on the coolant to retain the coolant in the cooling system of the radiator independent of a system opening at the repair/maintenance location. The rate of air input flow to the venturi is controlled to ensure that there is enough vacuum in the system to hold the fluid in the radiator. This may be initially calculated by opening air inlet port 12 until moisture is observed exiting from discharge hose 30. However, it may be more economical to calibrate a certain amount of air flow based on the different sizes of radiators involved. Thus, there may be provided with this device a calibration setting specification for standard size radiators.

As can be seen in FIGS. 8A and 8B, as the air flow from source canister 10 proceeds through nozzle 78a or 78b towards discharge port 16, a suction effect is created around nozzle 78a or 78b, thereby creating a vacuum which holds the fluid in the cooling system, radiator, or other component. At this point, one is able to proceed with the maintenance or repair needed. Once the maintenance or repair is complete flow control valve 82 is closed, and, if desired, then pressure testing may be accomplished using apparatus 40 in the pressure test configuration mode.

The preferred pressurized medium for apparatus 40 is 30 CFM air at 100-160 psi, and more preferably 30 CFM air at 120-150 psi, which is suitable for most applications. Even if continuous 30 CFM air is not available, most compressors will provide enough air to permit apparatus 40 to hold coolant for a sufficient amount of time to perform many simple repairs. However, if adequate air supply is not available, it is possible to use apparatus 40 and to install a temporary plug or cap over the system opening, and then reinstall the repaired or replacement components once the source air compressor has restored pressure to approximately 150 psi. To conserve source air and to prevent compressor bleed down, it is recommended that apparatus 40 not be left in the "retain coolant" (i.e. vacuum) mode for an excessive period of time and that it be attended at all times during use, although operationally such attendance is not required.

Figure 9A:
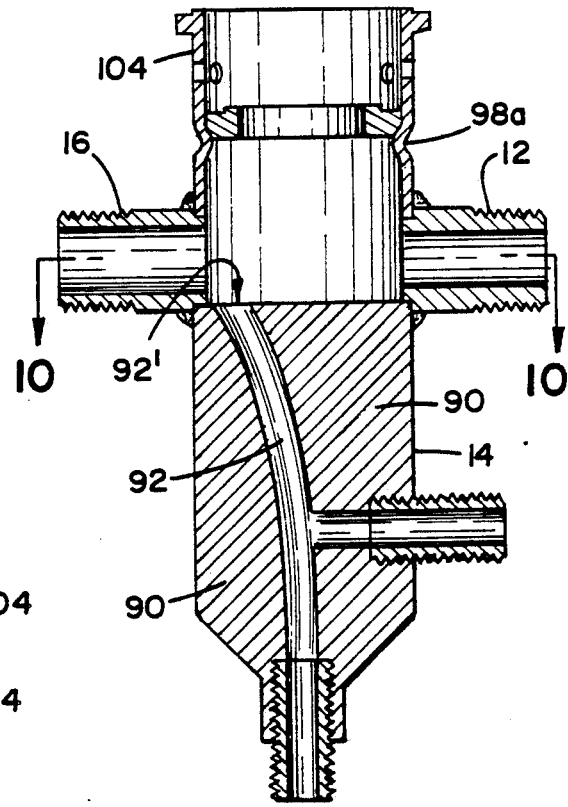
FIG. 9A illustrates a cross sectional view of a molded version of the main body similar in external appearance to that shown in FIG. 4, but including integral nozzle means.
Figure 9B:
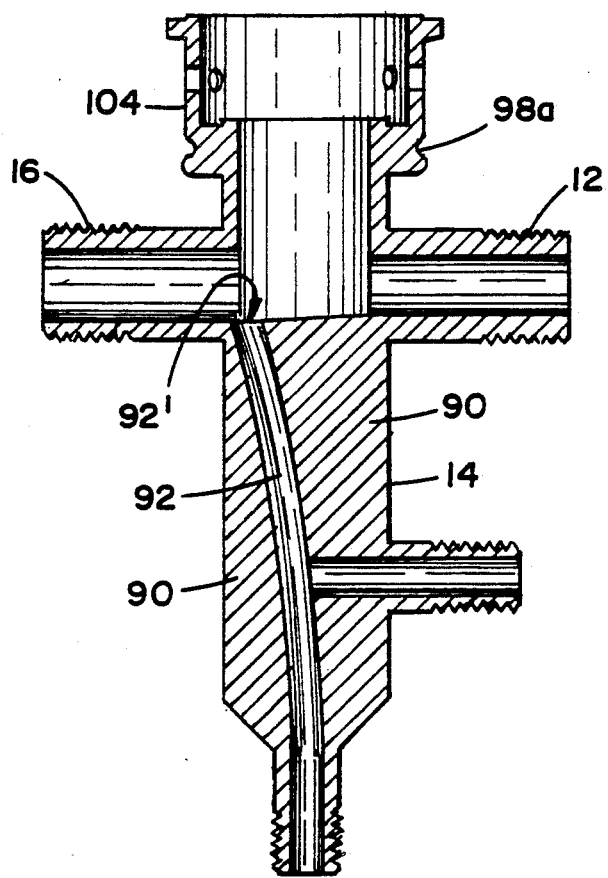
FIG. 9B illustrates a cross sectional view of an alternate embodiment cast version of the main body and nozzle means corresponding generally to that shown in FIG. 9A.

FIGS. 9A and 9B show alternate embodiment molded and cast versions of center body housing 14 and peripherals having a unitary construction. In these embodiments center body housing 14 is substantially filled with a material or metal 90, except for passage 92 defined thereby. Inlet and outlet conduits 12, 16 are thus molded integrally with center body 14. A gauge fitting may be similarly constructed, as well as other connections as may be necessary.

Figure 10:
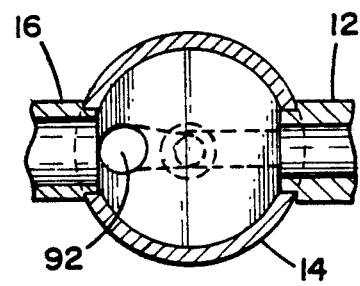
FIG. 10 is a top elevation view of FIG. 9A.

As can been seen in FIGS. 9A, 9B, and 10, a venturi effect is achieved by partially sealing the lower part of main body 14 such that only narrow passage 92 exists in main body 14. This configuration creates a vacuum effect within passage 92 when a sufficient flow rate of pressurized medium travels past passage opening 92' from inlet port 12 to outlet port 16, resulting in the retention of a coolant liquid in the coolant system.

Using the air supply of a maintenance/repair shop along with apparatus 40, a vacuum is created, which holds coolant in the cooling system with little or no coolant loss. This is particularly advantageous when minor repairs such as removing or replacing pipe plugs, sensors, valves and the like are made, since there is no need to spend valuable shop time draining and refilling the coolant system. In addition, it is not necessary to wait for the system to completely cool before repairs are made since the coolant is retained in the system. However, it is preferable if the system has cooled to at least 100° F. before apparatus 40 is attached to the radiator of the vehicle. Thus, repairs can be made much more efficiently, and the vehicle can be returned to service again much more quickly.

Another advantage to this invention is that once the repair or replacement is completed, apparatus 40 can be readily used to pressure test the system to check for any leaks therein. Apparatus 40 conveniently utilizes shop air supply to safely pressurize and test cooling systems. Pressure gauge 38 permits monitoring and control of the pressure being applied onto the coolant. Maximum pressure exerted on the cooling system is preferably also controlled by a standard automotive radiator cap 20. Yet even further advantage is provided by the portable, hand carryable compact size of apparatus 40.

Referring to FIG. 4, to pressure test the system, flow control valve 82 and pressure gate valve 86 are closed. Flow control valve 82 is then slowly opened to a test pressure or until a positive pressure reading on pressure gauge 38 preferably at least equal to the normal or operating system pressure is attained. The system pressure will vary depending on the radiator being tested. If flow control valve 82 is inadvertently opened too far, self-locking radiator cap 20 mounted on apparatus 40 will exhaust excess air through pressure relief port(s) 72, 74, 76, to aid in the prevention of damage or over-pressurization of the cooling system. Self-locking radiator cap 20 can be configured to handle different exhaust rates. Thus, as a pressure tester, apparatus 40 quickly checks the maintenance./repair with positive pressure from source/shop air without tedious hand pumping or system preparations. Moreover, leaks still present in the system do not as readily bleed down the internal system pressure during the testing. This efficiency is particularly valuable when testing might otherwise have to be accomplished over a significant time period, such as overnight.

Figure 11:
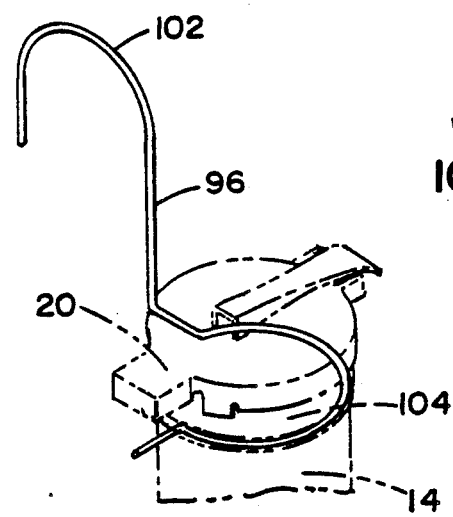
FIG. 11 illustrates a hanger which fits around the main body as shown in FIGS. 8B and 9A.

FIG. 11 shows a hanger which fits snugly around the neck of apparatus 40. As can be best seen in FIGS. 8B, 9A, 9B, and 11, hanger 96 fits around the neck of housing 14 at indents such as indent 98 or 98a. Hanger 96 pressure clips onto the upper neck 104 of center body housing 14. The hook end 102 of hanger 96 is attached to the raised hood of a vehicle or other convenient fixture, thereby providing greater ease of use and stability for apparatus 40, especially in situations where extension hose 52 is utilized.

Figure 12:
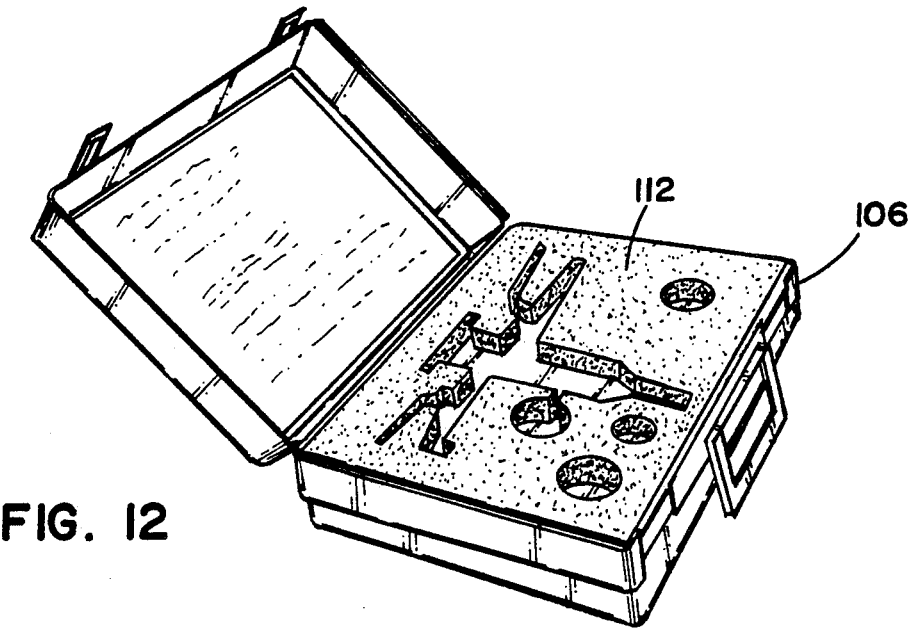
FIG. 12 illustrates a storage case for the pressure and tester apparatus.

After apparatus 40 has been used to retain coolant and then used as a pressure tester to check for leaks, apparatus 40 can be disassembled and placed in a convenient carrying or storage case 106 as shown in FIG. 12. Case 106 is generally made from reinforced plastic with internal resilient foam divider(s) 112. The carrying case 106 may contain apparatus 40, radiator cap adapter 50, discharge hose 30 with safety clip 42, spring hanger 96, extension hose 52, spacer washers for seal improvement, and operating instructions. Cut-out openings in divider(s) 112 for each of the components are included in case 106 for more convenient storage and protection of each of the components.

Figure 13:
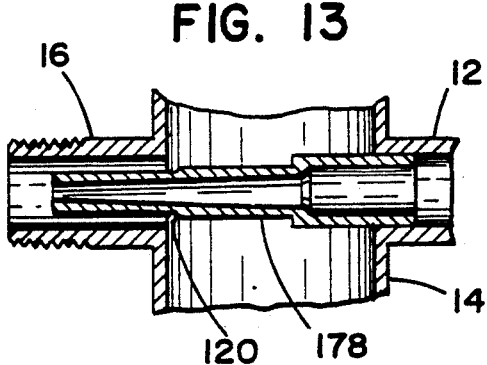
FIG. 13 illustrates alternate embodiment nozzle means.
Figure 14:
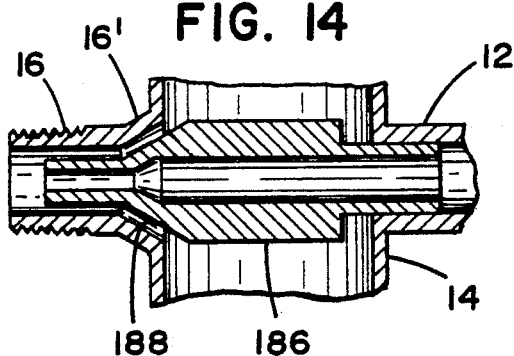
FIG. 14 illustrates alternate embodiment nozzle means.
Figure 15:
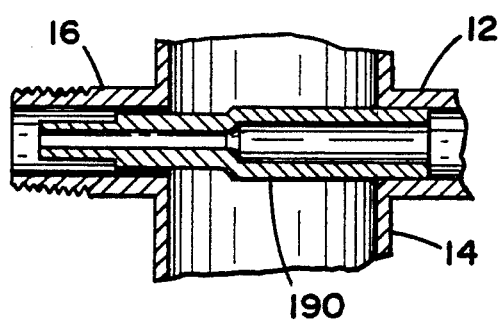
FIG. 15 illustrates alternate embodiment nozzle means.
Figure 16:
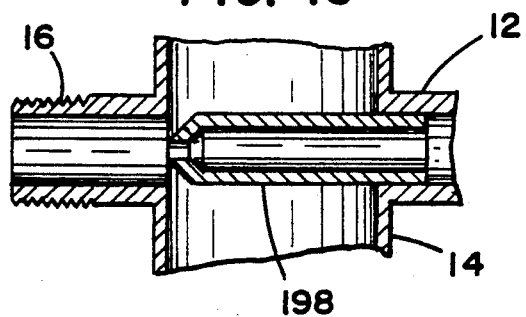
FIG. 16 illustrates alternate embodiment nozzle means.

Referring now to FIGS. 13-16, there are shown exemplary alternate embodiments of nozzle means configurations within the scope of this invention. For example, as shown in FIG. 13, a nozzle 178 is configured within housing 14. Nozzle 178 comprises an outer step down configuration which includes a chamfered portion 180 proximate the portion of nozzle 178 which enters into exhaust conduit 16. Alternately, FIG. 14 illustrates double chamfered nozzle means comprising a nozzle 186 which includes chamfered outer surfaces 188 with a substantially corresponding chamfered conduit entry surface 16' comprising the internal entry portion of exhaust conduit 16. FIG. 15 discloses yet another possible configuration of nozzle means. In FIG. 15, nozzle 190 comprises a modified stepped down outer configuration and slightly tapered or chamfered inner configuration wherein a non-tapered extension portion of nozzle 190 extends substantially into exhaust conduit 16. In FIG. 16, yet another configuration of nozzle means is disclosed which comprises a nozzle 198 which does not extend into discharge conduit 16 but rather is chamfered or tapered to a discharge point more substantially completely within the core internal chamber of housing 14. Numerous other configurations of nozzle means are contemplated which comprises tapered outer and inner surfaces, stepped down outer and inner surfaces, flared and non-flared surfaces, straight bore and tapered bore configurations, etc.

Apparatus 40 of this invention has many useful functions since it can retain coolant in a block, tank, container, vessel, and the like, while repairs and/or replacements are being made, and with a quick valve lineup change apparatus 40 can be used as a pressure tester to check for leaks in the system being worked on. Since an average drain of a block and accompanying coolant refill typically requires approximately 12 to 15 minutes, it is clear that if the coolant does not need to be drained and then refilled, much labor and many man hours are saved. Further, additional time is saved since apparatus 40 can be attached, and repairs/replacements can be made, even if the system has not been completely cooled. In addition, apparatus 40 can be assembled and disassembled easily, both in the shop or in the field.

Many uses of apparatus 40, and/or configurations thereof, (some being achieved with altered procedures, etc.) are contemplated within the scope of this invention, including but not limited to: holding coolant in an engine; holding hydraulic fluid in a system; pressure testing of cooling systems; bleeding air from hydraulic clutch control systems; bleeding air from hydraulic brake systems; changing electrical, vacuum, air, and temperature sensor units which screw into coolant jackets; changing and/or installing water pumps; pressure testing an air intake aftercooler on diesel engines; changing/installing block plug heaters; testing radiator caps; evacuating air conditioning systems; changing coolant heater hoses; changing thermostats; holding fluid during repair of fluid tank crossover valves; changing heater cores and control valves; pressure testing engines for internal coolant leaks; holding coolant while changing liquid cooled air compressors on engines; power vacuum cleaner attachment; providing vacuum source to vacuum test ignition distributor advance mechanisms; providing vacuum source to vacuum test vacuum operated engine controls; providing vacuum source to vacuum test various reservoirs and plumbing; providing vacuum source to vacuum test vacuum operated heater controls; installing coolant shut off valves for fuel warmers and fuel/water separators; vaporizer valve repair/replacement in propane fuel vehicles; forklift repairs/maintenance; stationary generator engines, such as for emergency power backup systems and the like; and many other uses. For example, apparatus 40 can be used in mining environments to perform minor cooling and hydraulic system repairs in an environment where cooling system leakage is quite unacceptable.

While this invention is susceptible of embodiment in many different forms, there are shown in the drawings and described herein in detail several specific embodiments, with the understanding that the present disclosure is to be considered as an exemplification of the principals of the invention and is not intended to limit the invention to the embodiments illustrated.

What is claimed is:

1. A pressure and vacuum test apparatus for retaining fluid in a closed loop fluid containing operating system during maintenance and repair, and for pressure testing the operating system after completion of work thereon, comprising:
   a) a main housing having walls defining an internal chamber;
   b) an inlet conduit having walls defining a first inner flow chamber suitable for providing flow through passage for a pressurized medium, said inlet conduit being connected to said main housing;
   c) an outlet conduit having walls defining a second inner flow chamber suitable for providing flow through passage for a medium, said outlet conduit being connected to said main housing;
   d) attachment means on said main housing for connecting the apparatus to a normally closed loop fluid containing operating system so that the fluid within said operating system is in flow through communication with said main housing internal chamber;
   e) nozzle means functioning in cooperation with said main housing for selectively creating different pressure levels within said internal chamber when a pressurized medium flows therethrough so that the apparatus selectively provides a vacuum effect and a pressurized effect upon fluid within the closed-loop operating system to both retain the fluid in the operating system during work thereon and to permit pressure testing of the operating system at the completion of such work.

2. The apparatus of claim 1, wherein said inlet conduit comprises an inlet flow control valve and said outlet conduit comprises an outlet flow pressure gate valve.

3. The apparatus of claim 1, further comprising pressure gauge means connected to said main housing for sensing and indicating the pressure within said main housing internal chamber.

4. The apparatus of claim 1, further comprising pressure relief means for selectively venting pressure from within said main housing internal chamber.

5. An apparatus for retaining coolant in an engine cooling system during maintenance and repair and for pressure testing the engine cooling system for leaks after completion of work thereon, comprising:
   a) a main housing having a first end, a second end, and walls defining an internal chamber;
   b) an inlet conduit having walls defining a first inner flow chamber suitable for providing flow through passage for a pressurized medium, said inlet conduit being connected to said main housing;
   c) an outlet conduit having walls defining a second inner flow chamber suitable for providing flow through passage for a medium, said outlet conduit being connected to said main housing;
   d) pressure relief means positioned on the first end of said main housing;
   e) attachment means located on the second end of said main housing for connecting the apparatus to an engine cooling system so that any coolant fluid within the engine cooling system is in flow through communication with said main housing internal chamber; and,
   f) nozzle means located within said main housing internal chamber for selectively creating different pressure levels within said internal chamber when a pressurized medium flows therethrough so that the apparatus selectively provides a vacuum effect and a pressurized effect upon any coolant fluid within the engine cooling system.

6. The apparatus of claim 5, further comprising a pressurized medium source connected to said inlet conduit to provide a flow of a pressurized medium from said source through the apparatus to said outlet conduit.

7. The apparatus of claim 6, further comprising an inlet control valve positioned in said inlet conduit, and an outlet control valve positioned in said outlet conduit.

8. An apparatus for retaining coolant in a radiator cooling system while repairs are made to the cooling system, comprising:
   a) a main housing having a first end, a second end, and walls defining an internal chamber;
   b) an inlet conduit having walls defining a first inner flow chamber suitable for providing flow through passage for a medium, said inlet conduit being connected to said main housing;
c) an outlet conduit having walls defining a second inner flow chamber suitable for providing flow through passage for a medium, said outlet conduit being connected to said main housing at a location substantially opposite from said inlet conduit;
d) pressure relief means positioned on the first end of said main housing;
e) attachment means located on the second end of said main housing for connecting the apparatus to a radiator cooling system so that any coolant fluid within the radiator cooling system is in flow through communication with said main housing internal chamber;
f) pressure gauge means located on said main housing, said pressure gauge means being constructed and arranged for sensing pressure within said main housing internal chamber; and
g) nozzle means located within said main housing internal chamber and extending generally from said inlet conduit toward said outlet conduit for creating differential pressure regions within said apparatus so that a low pressure within said main housing internal chamber provides a suction upon coolant within the radiator cooling system and retains the coolant within the radiator cooling system while maintenance and repair is accomplished thereon independent of any temporary openings introduced into the radiator cooling system due to such maintenance and repair.

9. The apparatus of claim 8, further comprising a pressurized medium source connected to said inlet conduit to provide a flow of a pressurized medium from said source through the apparatus to said outlet conduit.

10. The apparatus of claim 9, further comprising a discharge hose connected to said outlet conduit, and a supply hose connecting the pressurized medium source to said inlet conduit.

11. The apparatus of claim 10, further comprising an inlet control valve, said inlet control valve being positioned in said inlet conduit.

12. The apparatus of claim 11, wherein said inlet control valve regulates the flow of the pressurized medium from said pressurized medium supply source through said main housing so that as the pressurized medium flows from said inlet conduit through said nozzle means toward said outlet conduit, a venturi effect results, creating a vacuum in the main housing, which in turn creates a vacuum effect that acts upon and retains the coolant in the radiator cooling system.

13. A method for retaining a fluid in a closed-loop fluid-containing operating system during periods when the operating system is opened for maintenance and repair, and for pressure testing the system after completion of work thereon and closure thereof, comprising the steps of:
a) providing a pressure and vacuum apparatus having a main housing with walls defining an internal chamber, an inlet conduit having a flow control valve and an outlet conduit having a pressure gate valve, each conduit constructed for providing flow through passage of a pressurized medium generally to and from said main housing internal chamber;
b) installing said pressure and vacuum apparatus onto a normally closed-loop fluid-containing operating system at a location above the level of any fluid contained within the operating system so that such fluid is in communication with the main housing internal chamber;
c) verifying closed said flow control valve and opening said pressure gate valve;
d) attaching a pressurized medium supply source to said flow control valve;
e) opening said flow control valve to permit flow of the pressurized medium from said flow control valve through said pressure gate valve to create a fluid retaining vacuum within the pressure and vacuum apparatus prior to and during repair and maintenance upon the operating system.

14. The method of claim 13 further comprising the steps of:
a) closing said flow control valve;
b) closing said pressure gate valve; and
c) opening said flow control valve until the pressure within said internal chamber reaches a predetermined pressure for pressure testing the repairs and maintenance performed on the operating system.

15. A method for retaining coolant in an engine cooling system while component replacements or repairs are made to the cooling system, for pressure testing the cooling system after completion of repairs, and for utilizing a combination pressure and vacuum apparatus, comprising the steps of:
a) providing a pressure and vacuum apparatus having a main housing with walls defining an internal chamber, an inlet conduit and an outlet conduit each constructed for providing flow through passage of a pressurized medium through said main housing internal chamber;
b) removing a radiator cap from an engine coolant fill neck;
c) installing the pressure and vacuum apparatus on the fill neck so that coolant within the engine radiator is in communication with the main housing internal chamber;
d) securing a discharge hose extending from said pressure and vacuum apparatus outlet conduit to a fixture;
e) locking a self-locking radiator cap onto a top end of said pressure and vacuum apparatus;
f) closing a flow control valve;
h) opening a pressure gate valve;
i) attaching a pressurized medium supply source hose to said flow control valve; and
j) opening said flow control valve to permit flow of a pressurized medium from said flow control valve through said pressure gate valve to create a coolant retaining vacuum within the pressure and vacuum apparatus to and during repair and maintenance of the engine cooling system.

16. The method of claim 15 further comprising the steps of:
a) closing said flow control valve;
b) closing said pressure gate valve; and
c) opening said flow control valve until the pressure within said internal chamber reaches a predetermined pressure for pressure testing the repairs and maintenance performed on the cooling system.

* * * * *